US008605080B2

(12) United States Patent
Byun

(10) Patent No.: US 8,605,080 B2
(45) Date of Patent: Dec. 10, 2013

(54) ORGANIC ELECTROLUMINESCENT DISPLAY DEVICE AND METHOD OF DRIVING THE SAME

(75) Inventor: Seung-Chan Byun, Incheon (KR)

(73) Assignee: LG Display Co., Ltd., Seoul (KR)

( * ) Notice: Subject to any disclaimer, the term of this patent is extended or adjusted under 35 U.S.C. 154(b) by 225 days.

(21) Appl. No.: 13/109,761

(22) Filed: May 17, 2011

(65) Prior Publication Data

US 2011/0279422 A1 Nov. 17, 2011

(30) Foreign Application Priority Data

May 17, 2010 (KR) ........................ 10-2010-0046007

(51) Int. Cl.
*G06F 3/038* (2013.01)

(52) U.S. Cl.
USPC .......................................... 345/214; 345/204

(58) Field of Classification Search
None
See application file for complete search history.

(56) References Cited

U.S. PATENT DOCUMENTS

| | | | | |
|---|---|---|---|---|
| 2006/0145968 | A1* | 7/2006 | You et al. | 345/76 |
| 2006/0221004 | A1* | 10/2006 | You et al. | 345/76 |
| 2007/0040769 | A1* | 2/2007 | Tai et al. | 345/76 |
| 2009/0303220 | A1* | 12/2009 | You et al. | 345/211 |
| 2011/0057919 | A1* | 3/2011 | Kim et al. | 345/211 |

FOREIGN PATENT DOCUMENTS

| | | | |
|---|---|---|---|
| CN | 1797525 | A | 7/2006 |
| KR | 1020080062678 | A | 7/2008 |
| KR | 1020090112199 | A | 10/2009 |

OTHER PUBLICATIONS

Office Action issued in corresponding Chinese Patent Application No. 201110130261.1, mailed May 30, 2013, 13 pages.
Office Action issued in corresponding Korean Patent Application No. 10-2010-0046007, mailed May 30, 2013, 4 pages.

* cited by examiner

*Primary Examiner* — Adam R Giesy
(74) *Attorney, Agent, or Firm* — Brinks Gilson & Lione

(57) ABSTRACT

An organic electroluminescent display device includes: a plurality of sub-pixels in a matrix form along a plurality of row and column lines and each including a light emitting diode; first and second driving transistors in the sub-pixel, connected in parallel with each other, and connected to the organic light emitting diode; first and second switching transistors in the sub-pixel, and connected to the first and second driving transistors, respectively; first and second gate lines along the row line and connected to the first and second switching transistors, respectively; and a data selecting portion selecting a refresh data or an image data, wherein the data selecting portion selects one of the refresh data and the image data when the first switching transistor is turned on, and selects the other one of the refresh data and the image data when the second switching transistor is turned on, and wherein the plurality of sub-pixels include sub-pixels an input sequence of the refresh data and the image data to which is reversed for a frame.

13 Claims, 8 Drawing Sheets

$n^{th}$ frame $(n+1)^{th}$ frame $(n+1)^{th}$ frame

ORGANIC ELECTROLUMINESCENT DISPLAY DEVICE AND METHOD OF DRIVING THE SAME

This application claims the benefit of Korea Patent Application No. 10-2010-0046007, filed on May 17, 2010, the entire contents of which is incorporated herein by reference for all purposes as if fully set forth herein.

BACKGROUND

1. Field of the Invention

The present invention relates to an organic electroluminescent display device, and more particularly, to an organic electroluminescent device and a method of driving the same.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and organic electroluminescent display (OELD) devices, as a substitute for CRTs. Of these flat panel displays, OELD devices have many advantages, such as low power supply, thin profile, wide viewing angle light weight, and fast response time.

In general, among the OELD devices, an active matrix type OELD is widely used. The OELD device display images by applying a current to an organic light emitting diode in each pixel and emitting light from the organic light emitting diode.

In operating the organic light emitting diode, when a thin film transistor using an amorphous silicon is employed, a current continues to be supplied to the organic light emitting diode. Accordingly, reduction of brightness and continuous stress due to shift of threshold voltage causes lifetime of the thin film transistor to be reduced.

To solve the problems, a structure using dual thin film transistors is suggested. In this structure, an image data and a refresh data (e.g., a data for a negative voltage or black data) are alternately applied to one and the other of the dual thin film transistors. Accordingly, reduction of stress and increase of lifetime of thin film transistor are achieved.

However, according to a sequence of applying the image data and refresh data, an overall screen may flash, and thus display quality is degraded.

BRIEF SUMMARY

An organic electroluminescent display device includes: a plurality of sub-pixels in a matrix form along a plurality of row and column lines and each including a light emitting diode; first and second driving transistors in the sub-pixel, connected in parallel with each other, and connected to the organic light emitting diode; first and second switching transistors in the sub-pixel, and connected to the first and second driving transistors, respectively; first and second gate lines along the row line and connected to the first and second switching transistors, respectively; and a data selecting portion selecting a refresh data or an image data, wherein the data selecting portion selects one of the refresh data and the image data when the first switching transistor is turned on, and selects the other one of the refresh data and the image data when the second switching transistor is turned on, and wherein the plurality of sub-pixels include sub-pixels an input sequence of the refresh data and the image data to which is reversed for a frame.

In another aspect, a method of driving an organic electroluminescent display device, which includes a plurality of sub-pixels in a matrix form along a plurality of row and column lines and each including a light emitting diode, the method includes: sequentially scanning first and second gate lines corresponding to the row line and sequentially turning on first and second driving transistors of the sub-pixel; inputting one of a refresh data and an image data to the sub-pixel when the first switching transistor is turned on; and inputting the other one of the refresh data and the image data to the sub-pixel when the second switching transistor is turned on, wherein the plurality of sub-pixels include sub-pixels an input sequence of the refresh data and the image data to which is reversed for a frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to illustrated embodiments of the present invention, which are illustrated in the accompanying drawings.

Figure 1:
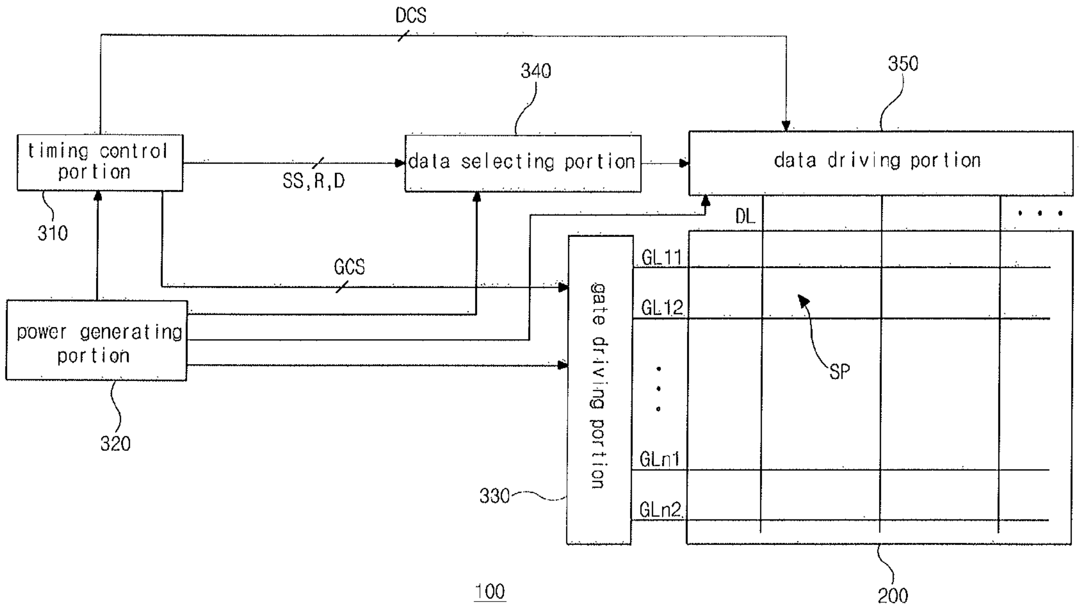
FIG. 1 is a block diagram illustrating an GELD device according to an embodiment of the present invention.
Figure 2:
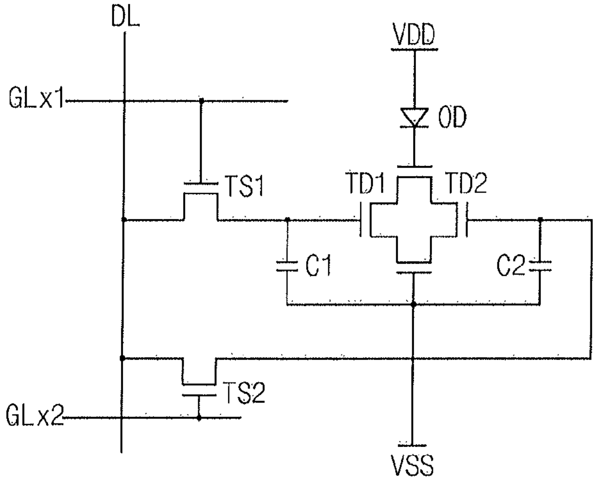
FIG. 2 is an equivalent circuit diagram of a sub-pixel of the GELD device according to the embodiment of the present invention.

FIG. 1 is a block diagram illustrating an OELD device according to an embodiment of the present invention, and FIG. 2 is an equivalent circuit diagram of a sub-pixel of the OELD device according to the embodiment of the present invention.

Referring to FIGS. 1 and 2, the OELD device 100 of the embodiment includes a display panel 200 and a driving portion.

The display panel 200 includes gate lines GL11 to GLn2 in a first direction, for example, in a row direction, and data lines DL in a second direction crossing the first direction, for example, in a column direction. The gate and data lines GL11 to GLn2 and DL define sub-pixels SP arranged in a matrix form.

Each sub-pixel SP includes first and second switching transistors TS1 and TS2, first and second driving transistors TD1 and TD2, an organic light emitting diode OD and first and second capacitors C1 and C2.

The first and second switching transistors TS1 and TS2 are connected to the corresponding gate and data lines. For example, the first switching transistor TS1 is connected to a first gate line GLx1 and the data line DL, and the second switching transistor TS2 is connected to a second gate line GLx2 and the data line DL that is the same data line DL connected to the first switching transistor.

The first and second driving transistors TD1 and TD2 are connected to the first and second switching transistors TS1 and TS2. For example, Gate electrodes of the first and second driving transistors TD1 and TD2 are connected to drain electrodes of the first and second switching transistors TS1 and TS2, respectively.

The organic light emitting diode OD is connected to the first and second driving transistors TD1 and TD2. For example, a second electrode, for example, a cathode of the light emitting diode OD is connected to drain electrodes of the first and second driving transistors TD1 and TD2. A first electrode, for example, an anode of the light emitting diode OD is applied with a first driving voltage VDD. The first and second driving transistors TD1 and TD2 are connected in parallel to each other. The organic emitting diode includes an organic light emitting layer, which includes an organic light emitting material, between the first and second electrodes.

The first capacitor C1 is connected between the gate and drain electrodes of the first driving transistor TD1. The second capacitor C2 is connected between the gate and drain electrodes of the second driving transistor TD2. The source electrodes of the first and second driving transistors TD1 and TD2 are supplied with a second driving voltage VSS. For example, the source electrodes of the first and second driving transistors TD1 and TD2 may be grounded.

For the sub-pixel SP as configured above, when the gate line GL is scanned and is applied with a turn-on voltage, for example, a gate high voltage, the switching transistor TS connected thereto is turned on. Accordingly, a data voltage passes through the switching transistor TS and applied to the gate electrode of the corresponding driving transistor TD. Accordingly, a current passes through the driving transistor Td and is supplied to the organic light emitting diode OD, and thus light is emitted.

A method of driving the OELD device is explained in more detail. The first and second gate lines GLx1 and GLx2 are sequentially enabled i.e., scanned. The data line DL is applied with an image data voltage (or a refresh data voltage) and a refresh data voltage (or an image data voltage) sequentially according to the sequential enabling of the first and second gate lines GLx1 and GLx2. The input sequence of the image data voltage and the refresh data voltage may change per a predetermined period, for example, one frame. The image data voltage may be a positive voltage, and the refresh data voltage may be a negative voltage.

Figure 3:
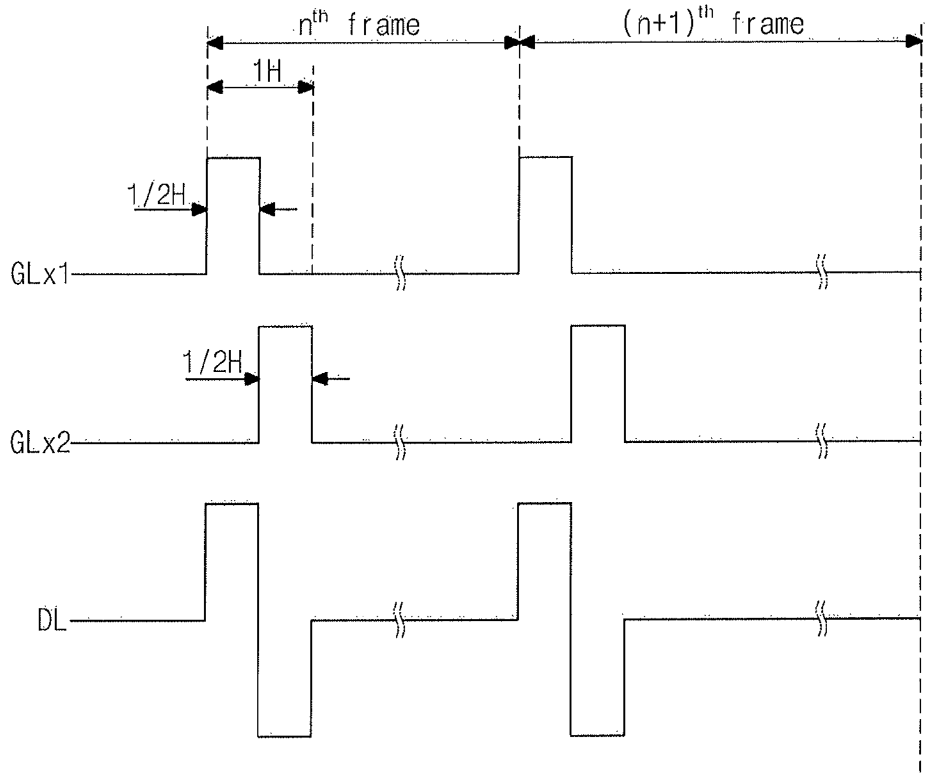
FIGS. 3 and 4 are timing charts of gate signals in the GELD device according to the embodiment of the present invention.

Referring further to FIG. 3, the first and second gate lines GLx1 and GLx2 are sequentially enabled at an interval of a half of a horizontal period H. If an image data voltage is applied earlier than a refresh data voltage for a $n^{th}$ frame, a refresh data voltage is applied earlier than an image data voltage for a $(n+1)^{th}$ frame. In more detail, for the $n^{th}$ frame, an image data voltage is applied to the data line DL when the first gate line GLx1 is enabled, and then a refresh data voltage is applied to the data line DL when the second gate line GLx2 is enabled. And, for the $(n+1)^{th}$ frame, opposite to the input sequence of the $n^{th}$ frame, a refresh data voltage is applied to the data line DL when the first gate line GLx1 is enabled, and then an image data voltage is applied to the data line DL when the second gate line GLx2 is enabled.

Figure 4:
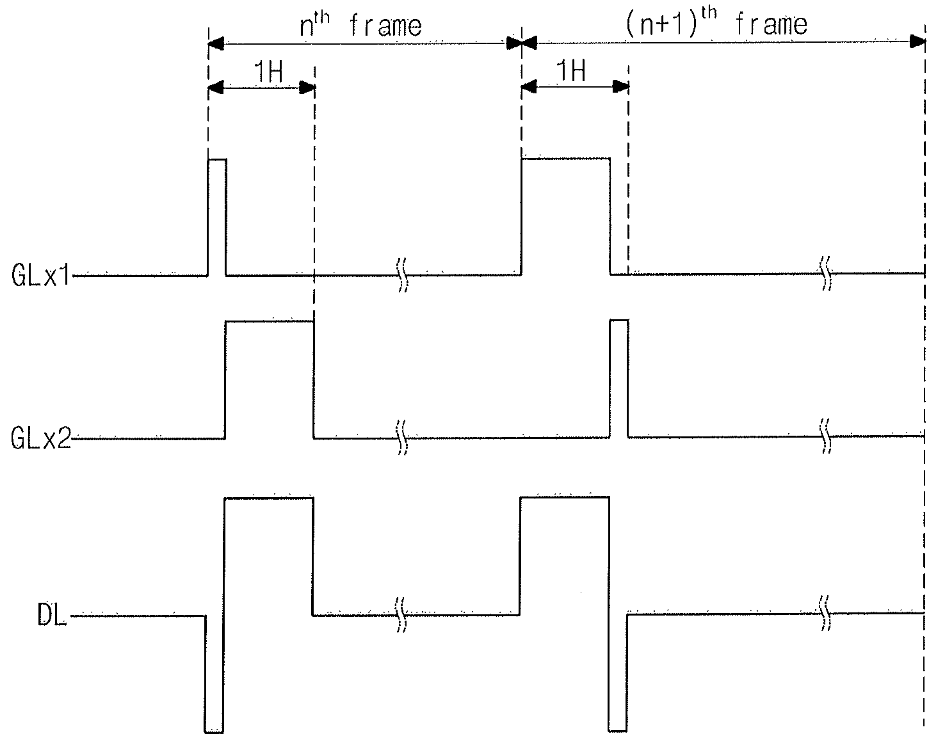

Referring to FIG. 4, the enabling times of the first and second gate lines GLx1 and GLx2 may be different per predetermined period. The enabling times of the first and second gate lines GLx1 and GLx2 may alternately change per predetermined period. In this case, an image data voltage may be applied to the data line DL when the gate line having a longer enabling time is enabled. For example, an image data voltage is applied when the first gate line GLx1 is enabled longer, and, in this case, a refresh data voltage is applied when the second gate line GLx2 is enabled, and vice versa.

As described above, the first and second gate lines GLx1 and GLx2 are sequentially enabled. Accordingly, the image data voltage (or the refresh data voltage) is charged into the first capacitor C1 through the first switching transistor TS1. Then, the refresh data voltage (or the image data voltage) is charged into the second capacitor C2 through the second switching transistor TS2.

According to the data voltage charged into the first capacitor C1, the first driving transistor TD1 is operated alternately between in an active mode and in a refresh mode per predetermined period. The active mode is, for example, a mode in which an image data is applied to the driving transistor TD, and the refresh mode is, for example, a mode in which a refresh data is applied to the driving transistor TD. For example, when a data voltage of the first capacitor C1 is a threshold voltage (for example, 0.7V) or more, the first driving transistor TD1 adjusts a current, which flows between a source of the first driving voltage VDD and a source of the second driving voltage VSS, according to the data voltage of the first capacitor C1. In this case, the current flows from the source of the first driving voltage VDD to the source of the second driving voltage VSS via the organic light emitting diode OD and a channel between the source and drain electrodes of the first driving transistor TD1.

On the contrary, when a data voltage of the first capacitor C1 is a refresh voltage, the first driving transistor TD1 is turned off and refreshed.

In similar way, the second driving transistor TD2 is operated alternately between in an active mode and in a refresh mode per predetermined period. The second driving transistor TD2 is operated in a mode opposite to the mode of the first driving transistor TD1. For example, when a data voltage of the second capacitor C2 is a threshold voltage (for example, 0.7V) or more, the second driving transistor TD2 adjusts a current, which flows between a source of the first driving voltage VDD and a source of the second driving voltage VSS, according to the data voltage of the second capacitor C1. In this case, the current flows from the source of the first driving voltage VDD to the source of the second driving voltage VSS via the organic light emitting diode OD and a channel between the source and drain electrodes of the second driving transistor TD2.

On the contrary, when a data voltage of the second capacitor C2 is a refresh voltage, the second driving transistor TD2 is turned off and refreshed.

As described above, the first and second driving transistors TD1 and TD2 are operated alternately between in the active and refresh modes and in different modes from each other. Accordingly, a current path of the organic light emitting diode OD is continuously kept, and an amount of a current supplied to the organic light emitting diode OD is adjusted according to level of data voltage.

Since the first and second driving transistors TD1 and TD2 are alternately operated per predetermined period, it is not need to make a current continuously flow on one driving transistor. Accordingly, stresses on the first and second driving transistors TD1 and TD2 are reduced. Therefore, lifetimes of the first and second driving transistors TD1 and TD2 increase.

The driving portion to drive the display panel 200 may include a timing control portion 310, a power generating portion 320, a gate driving portion 330, a data driving portion 340, and a data selecting portion 340.

Figure 5:
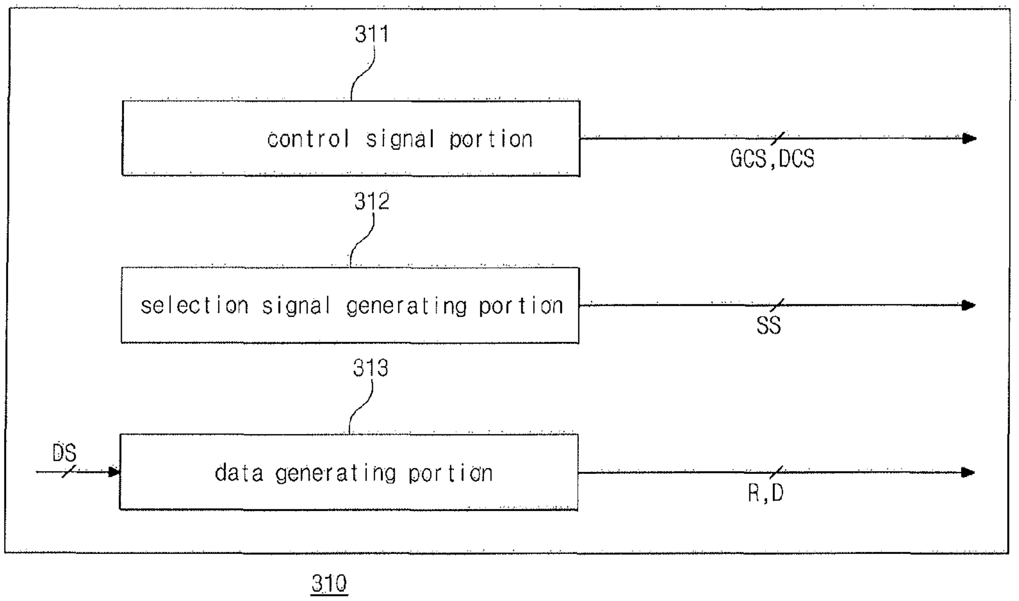
FIG. 5 is a view illustrating the timing control portion in the GELD device according to the embodiment of the present invention.

FIG. 5 is a view illustrating the timing control portion of the OELD device according to the embodiment of the present invention.

The timing control portion 310 may include a control signal portion 311, a selection signal generating portion 312 and a data generating portion 313.

The control signal portion 311 may generate a gate control signal GCS that controls the gate driving portion 320 and a data control signal DCS that controls the data driving portion 330, in response to a control signal inputted from an external system such as a video card.

The data generating portion 313 generates a refresh data R that maintains level of negative voltage and output the refresh data R to the data selecting portion 350. The data generating portion 313 may be supplied from the external system with, array and process image data DS. For example, the data generating portion 313 may output the image data D twice for a horizontal period H to the data selecting portion 350. This is because the sub-pixels SP on each row line are connected to the first and second gate lines GLx1 and GLx2. In more detail, the first and second gate lines GLx1 and GLx2 are turned on for the horizontal period H, and, when each of the first and second gate lines GLx1 and GLx2 is turned on, image data are outputted to the corresponding sub-pixels SP. Accordingly, since image data D are outputted to the data lines DL when each of the first and second gate lines GLx1 and GLx2 is turned on, the same image data D are outputted twice to the data selecting portion 350.

A method of applying image data D and refresh data R is explained with reference further to FIG. 6.

Figure 6:
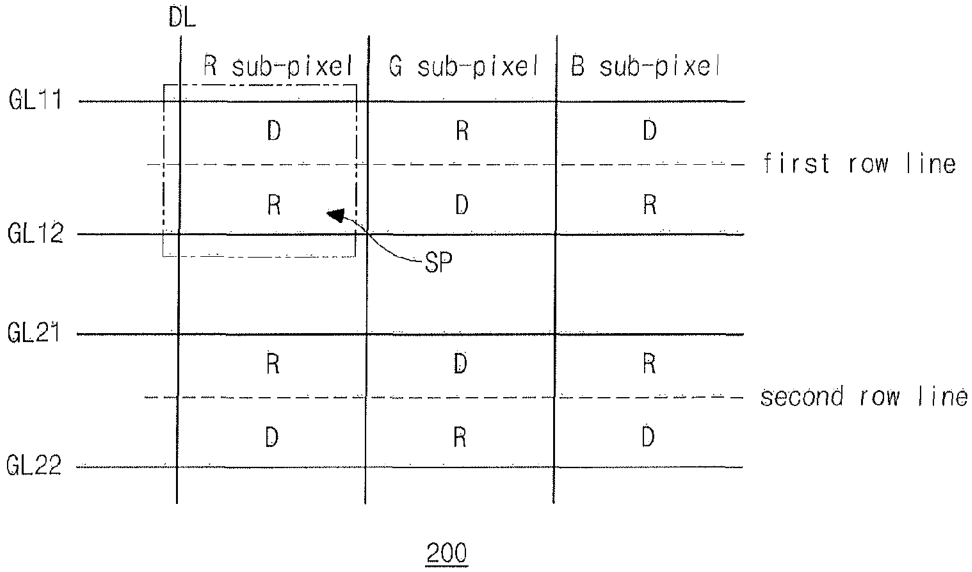
FIG. 6 is a view illustrating a method of applying image data and refresh data to sub-pixels according to the embodiment of the present invention.

FIG. 6 is a view illustrating a method of applying image data and refresh data to sub-pixels according to the embodiment of the present invention.

In FIG. 6, it is shown that red (R), green (G) and blue (B) sub-pixels SP are arranged on two row lines. On each row line, the first and second gate lines GL11 and GL21, and GL12 and GL22 are arranged. The adjacent R, G and B sub-pixels SP form a pixel which is a unit to display images.

The image data D and the refresh data R are alternately inputted to the sub-pixels SP per sub-pixel SP with respect to each of the gate lines GL11 to GL22, and the input sequence thereof is reversed per row line with respect to each column line.

Regarding the data input with respect to each of the gate lines GL11 to GL22, when the first gate line GL11 of the first row line is turned on, in case that the image data D is inputted to the R sub-pixel SP, the refresh data R is inputted to the G sub-pixel SP and the image data D is inputted to the B sub-pixel SP. Further, when the second gate line GL12 of the first row line is turned on, the refresh data R is inputted to the R sub-pixel SP, the image data D is inputted to the G sub-pixel SP, and the refresh data R is inputted to the B sub-pixel. In other words, to the sub-pixels SP corresponding to each of the gate lines GL11 to GL22, the image data D and the refresh data R are alternately supplied.

Regarding the data input with respect to each column line, for the first column line, in case that the image data D is inputted and then the refresh data R is inputted on the first row line, the refresh data R is inputted and then the image data D is inputted on the second row line. In other words, the input sequence of the first row line is image data D→refresh data R, and the input sequence of the second row line is refresh data R→image data D. Accordingly, the input sequence of the image data D and the refresh data R is reversed per row line.

The input sequences for the other column lines are reversed per row line in the same way as the input sequence for the first column line.

As described above, when the first and second gate lines GLx1 and GLx2 are sequentially turned on, the image data D and the refresh data R are inputted to the corresponding sub-pixels SP according to the method as described above. The timing control portion 310 outputs the same image data D twice for the horizontal period H.

The selection signal generating portion 312 generates a selection signal SS outputted to the data selecting portion 340. The selection signal SS is used to select one of the image data D and the refresh data R. The selection signal SS may include at least one of a pixel selection signal PSS and a row line selection signal LSS.

In the embodiment, the input sequence of the image data D and the refresh data R on the same row line may be reversed per at least one column line. Further, the input sequence of the image data D and the refresh data R on the same column line may be reversed per at least one row line. Further, the input sequence of the image data D and the refresh data R of the same sub-pixel SP may be reversed per at least one frame.

To do this, the image data D and the refresh data R are selected and combined. Accordingly, the selection signal SS is a signal to select the image data D and the refresh data R in a predetermined sequence.

The pixel selection signal PSS may be a signal to reverse the image data D and the refresh data R on the same row line per at least one column. That is, the pixel selection signal PSS may be a signal to alternately input the image data D and the refresh data R to the sub-pixels SP corresponding to the gate line GL per predetermined number of sub-pixels SP.

In more detail, for example, referring to FIG. 6, the pixel selection signal PSS is used to alternately apply the image data D and the refresh data R to the R, G and B sub-pixels corresponding to the first gate line GL11 of the first row line. Further, the pixel selection signal PSS is used to alternately apply the image data D and the refresh data R to the R, G and B sub-pixels corresponding to the second gate line GL12 of the first row line.

As described above, the pixel selection signal PSS is a signal to select data such that the image data D and the refresh data R are alternated on the same row line per predetermined number of sub-pixels SP. The pixel selection signal PSS may have one of a high voltage level and a low voltage level. In more detail, when the pixel selection signal PSS selects the image data D, the pixel selection signal PSS may have a high voltage level (or a low voltage level). When the pixel selection signal PSS selects the refresh data R, the pixel selection signal PSS may have a low voltage level (or a high voltage level). In other words, according to the voltage levels of the pixel selection signal PSS, the data applied to the sub-pixel SP is selected.

Further, the pixel selection signal PSS may be expressed in an array of values corresponding to a row line. For example, the pixel selection signal PSS may be expressed in an array of values, (1, 0, 1), and in this case, a first value "1" is a value corresponding to the R sub-pixel SP, a second value "0" is a value corresponding to the G sub-pixel SP, and a third value "1" is a value corresponding to the B sub-pixel.

The row line selection signal LSS may be a signal to reverse the input sequence of the image data D and the refresh data R on the column line per at least one row line. The image data D and the refresh data R correspond to one and the other, respectively, of the first and second gate lines GLx1 and GLx2 of the row line.

In more detail, for example, referring to FIG. 6, the row line selection signal LSS is used to apply to the R sub-pixel SP of the first row line the image data D and the refresh data R corresponding to the first and second gate lines GL11 and GL12, respectively. Further, the row line selection signal LSS is used to apply to the R sub-pixel SP of the second row line the refresh data R and the image data D corresponding to the first and second gate lines GL21 and GL22, respectively.

As described above, the row line selection signal LSS is a signal to select one of the image data D and the refresh data R corresponding to the gate line GL and determine the input sequence of the image data D and the refresh data R to the sub-pixels SP on the column line.

The row line selection signal LSS may have one of a high voltage level and a low voltage level. In more detail, for example, when the data, which is the same type as the data applied to the sub-pixel SP corresponding to the previous gate line, is applied to the sub-pixel SP corresponding to the current gate line, the row line selection signal LSS may have a high voltage level (or a low voltage level). When the data, which is the different type (i.e., the reverse type) from the data applied to the sub-pixel SP corresponding to the previous gate line, is applied to the sub-pixel SP corresponding to the current gate line, the row line selection signal LSS may have a low voltage level (or a high voltage level). In other words, according to the voltage levels of the row line selection signal LSS, the data, which is applied to the sub-pixel SP when the corresponding gate line GL is turned on, is selected.

The selection signal SS may include a frame selection signal FSS. The frame selection signal FSS may be used to reverse the data input sequence of the sub-pixel SP per at least one frame. In other words, the frame selection signal FSS is a signal to alternately input the image data D and the refresh data R to the sub-pixel SP at the same timing among frames. The at least one frame may be one frame.

Figure 7:
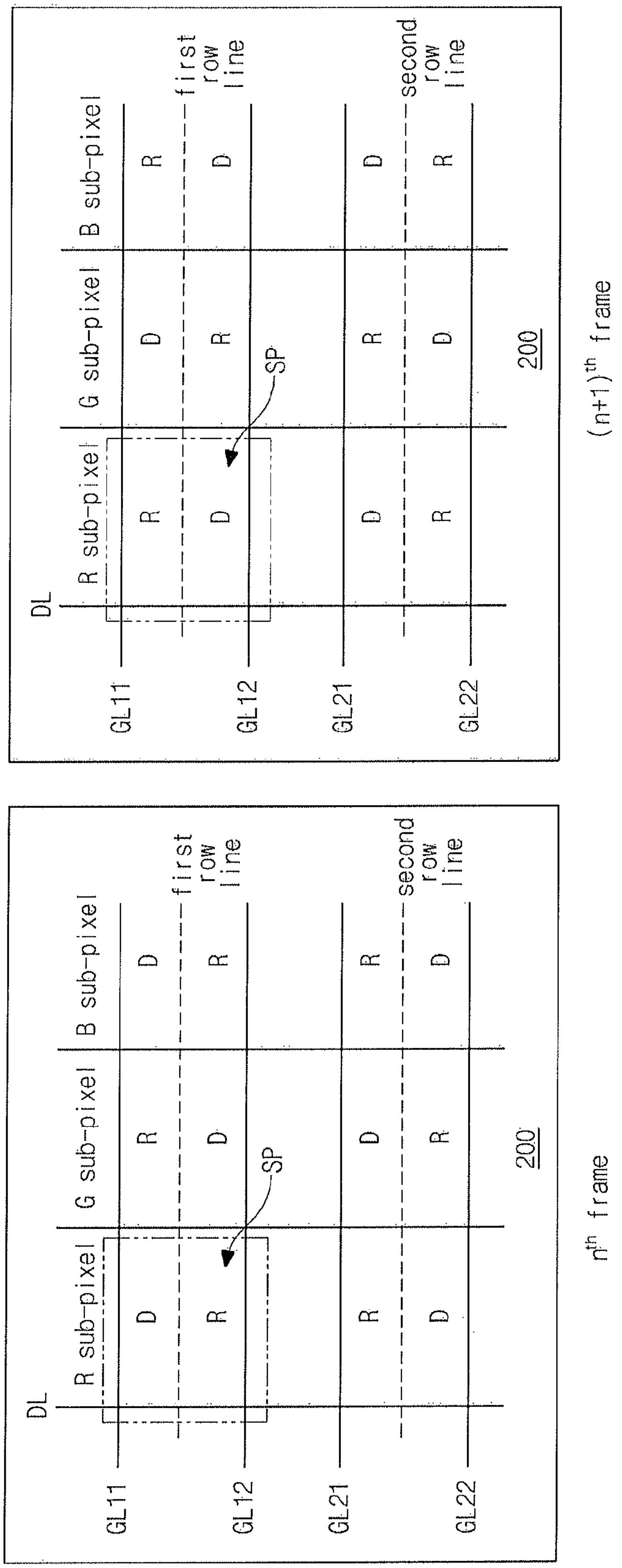
FIG. 7 is a view illustrating reverse of data per frame in the OELD according to the embodiment of the present invention.

FIG. 7 is a view illustrating reverse of data per frame in the OELD according to the embodiment of the present invention.

Referring to FIG. 7, according to the frame selection signal FSS, a pattern of data inputted to the sub-pixels SP for a $(n+1)^{th}$ frame are the reverse of a pattern of data inputted to the sub-pixels SP for a $n^{th}$ frame. In other words, the image data D for the previous frame are changed into the refresh data R for the current frame, and the refresh data R for the previous frame are changed into the refresh data R.

The frame selection signal FSS may have one of a high voltage level and a low voltage level. In more detail, for example, when the data, which is the same type as the data applied to the sub-pixel SP for the previous frame, is applied to the sub-pixel SP for the current frame, the frame selection signal FSS may have a low voltage level (or a high voltage level). When the data, which is the different type (i.e., the reverse type) from the data applied to the sub-pixel SP for the previous frame, is applied to the sub-pixel for the current frame, the frame selection signal FSS may have a high voltage level (or a low voltage level). In other words, according to the voltage levels of the frame selection signal FSS, the data applied to the sub-pixel SP is selected.

Figure 8:
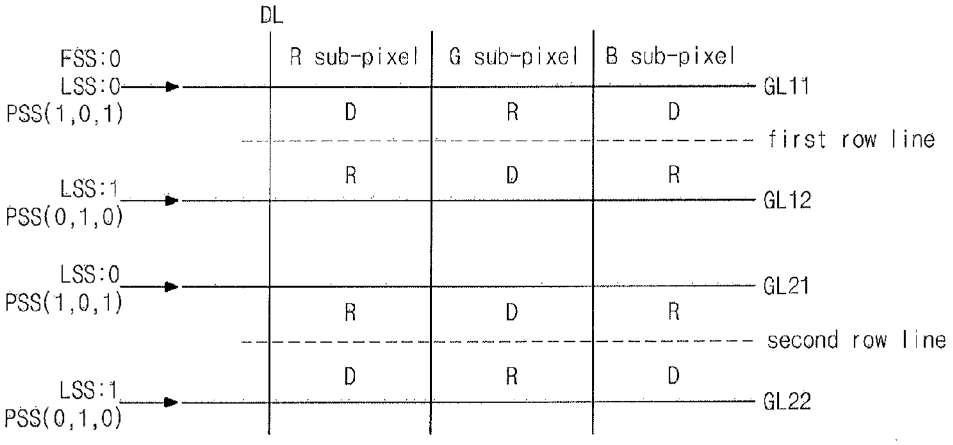
FIG. 8 is a view illustrating a method of selecting data in the GELD device according to the embodiment of the present invention.

The data selecting portion 340 selects the data in response to a selection signal SS supplied from the timing control portion 310. A method of selecting data is explained with further reference to FIG. 8. FIG. 8 is a view illustrating a method of selecting data in the OELD device of the embodiment of the present invention.

For the convenience of explanation, it is assumed that a low voltage level of the selection signal SS is expressed as a logic value of "0" and a high voltage level of the selection signal SS is expressed as a logic value of "1". Further, it is assumed that the image data D is selected when a value of the pixel selection signal PSS is "1", the data which is the reverse type of the data corresponding to the previous gate line GL is applied corresponding to the current gate line GL when a value of the row line selection signal LSS is "1", and the data which is the reverse type of the data for the previous frame is applied for the current frame when a value of the frame selection signal is "1". Further, a value of the row line selection signal LSS for the first gate line GL11 on the first row line may be "0" as an initial value because a gate line previous to the first gate line GL11 does not exist.

The data selecting portion 340 may be sequentially supplied with the selection signals SS each corresponding to the gate lines GL. In this case, the frame selection signal FSS may be supplied once per frame. In more detail, for example, with respect to the first gate line GL11 on the first row line, when a value of the frame selection signal FSS is "1", a value of the row line selection signal LSS is "0", and an array value of the pixel selection signal is (1, 0, 1), the data for a $(n+1)^{th}$ frame are the reverse type of the data for a $n^{th}$ frame. Further, since the previous gate line to the first gate line GL11 does not exist, the row line selection signal LSS has the value of "0". Further, since the pixel selection signal PSS has the array value of (1, 0, 1), the image data D is selected for the R sub-pixel SP, the refresh data R is selected for the G sub-pixel SP, and the image data D is selected for the B sub-pixel SP.

Further, with respect to the second gate line GL12 on the first row line, when a value of the row line selection signal LSS is "1", and an array value of the pixel selection signal PSS is (0, 1, 0), since the value of the row line selection signal LSS is "1", the data which is the reverse type of the data corresponding to the previous gate line i.e., the first gate line GL11 is selected. Accordingly, the pixel selection signal PSS is the reverse type of the pixel selection signal PSS corresponding to the first gate line GL11. Accordingly, the refresh data R is selected for the R sub-pixel SP, the image data D is selected for the G sub-pixel SP, and the refresh data R is selected for the B sub-pixel SP.

The image data D selected corresponding to the first gate line GL11 are from the first time image data among the image data outputted twice for a horizontal period H from the timing control portion 310. The image data D selected corresponding to the second gate line GL12 are from the second time image data among the image data outputted twice for the horizontal period H from the timing control portion 310.

It is preferred that the selection signal SS is configured such that the data input sequence is reversed per frame, per column and per row line. In other words, it is preferred that the frame selection signals FSS are changed alternately between “0” and “1” by the frame, the row line selection signals LSS are changed alternately between “0” and “1” by the gate line GL, and the pixel selection signals PSS are changed alternately between “0” and “1” by the sub-pixel SP. This is to effectively improve display quality by dispersing flash phenomenon in space and time because human eyes react according to an average amount of light by mixing of light.

Figure 9:
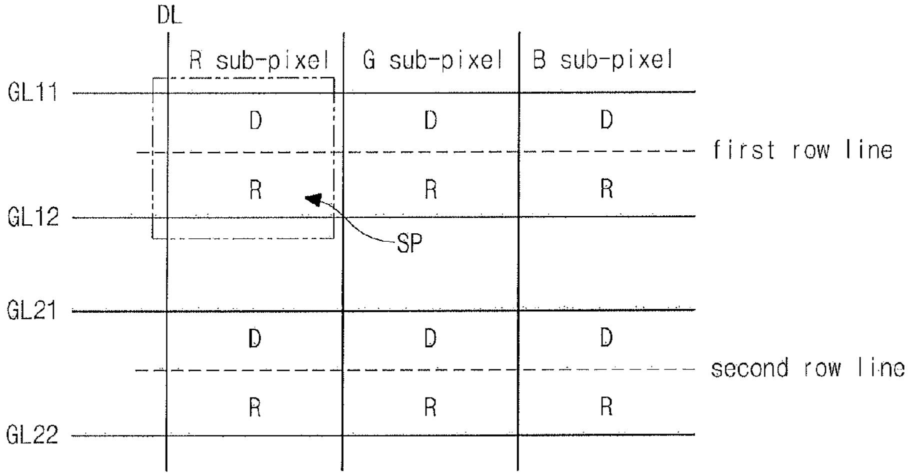
FIG. 9 Related Art
FIG. 9 is a view illustrating a method of applying data in an OELD device according to the related art.
Figure 10A:
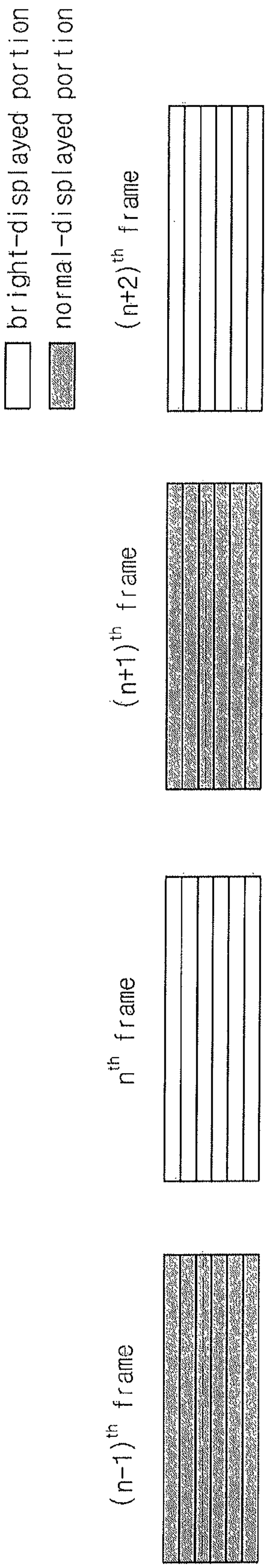
FIG. 10A Related Art
FIG. 10A is a view illustrating display patterns using a method of driving the OELD device according to the related art.

In the related art, as shown in FIG. 9, the image data D are applied in common to the first gate lines GL11 and GL21 and the refresh data R are applied in common to the second gate lines GL12 and GL22, for one frame, and the image data D and the refresh data R alternates per frame. Accordingly, as shown in FIG. 10A, the flash phenomenon occurs all over a display panel periodically. Since the flash is not dispersed as above, human eyes perceive the flash more and display quality is degraded.

Figure 10B:
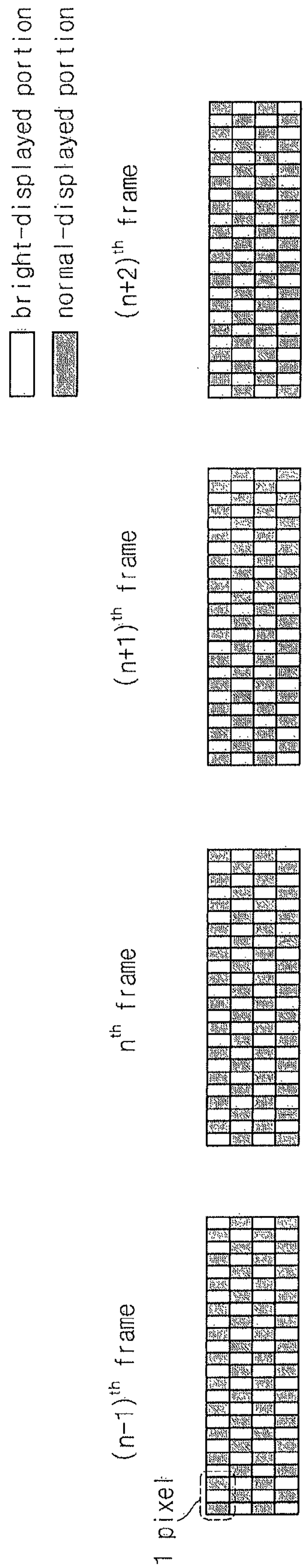
FIG. 10B is a view illustrating display patterns using a method of driving the GELD device according to the embodiment of the present invention.

However, in the embodiment, the data input sequence to the sub-pixels is reversed per frame, per column, and per row line. Accordingly, referring to FIG. 10B, the flash is dispersed in space along the column line and row line, and is dispersed in time. In the embodiment as described above, it is shown that the image data D and the refresh data R alternate per sub-pixel SP. Alternatively, the data alternate per pixel, and also, other manners may be employed.

The method of applying the data to the display panel 200 as above may be referred to a dot mixing method.

Another embodiment is explained with reference to FIG. 11. The another embodiment is similar to the above embodiment except for a data mixing method.

The dot mixing method as above can effectively reduce the flash. However, the dot mixing method needs much data transition, and thus increase of power consumption may be caused. To reduce power consumption, a line mixing method is suggested that disperses flash with respect to row line.

In more detail, in the line mixing method, the input sequence of the image data D and the refresh data R to the sub-pixels SP on each row line is identical, and the input sequence of the image data D and the refresh data R to the sub-pixels SP on the column row line is reversed per row line.

Figure 11:
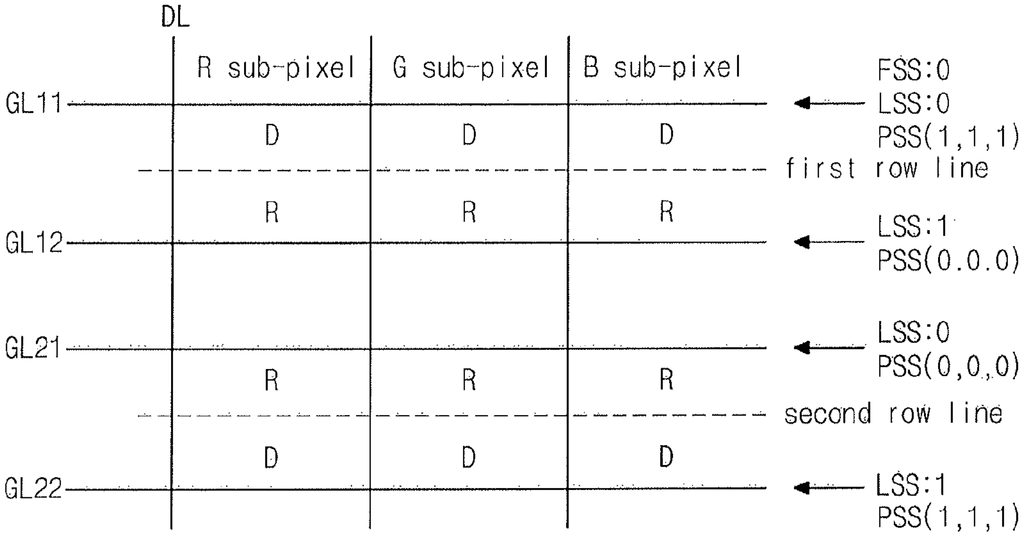
FIG. 11 is a view illustrating a method of applying data in an GELD device according to another embodiment of the present invention.

For example, referring to FIG. 11, for a $(n+1)^{th}$ frame, with respect to the first gate line GL11 on the first row line, when a value of the frame selection signal FSS is “1”, a value of the row line selection signal LSS is “0”, and an array value of the pixel selection signal is (1, 1, 1), the data for the $(n+1)^{th}$ frame are the reverse type of the data for a $n^{th}$ frame. Further, since the previous gate line to the first gate line GL11 does not exist, the row line selection signal LSS has the value of “0”. Further, since the pixel selection signal PSS has the array value of (1, 1, 1), the image data D are selected for the R, G and B sub-pixels SP.

Further, with respect to the second gate line GL12 on the first row line, when a value of the row line selection signal LSS is “1”, and an array value of the pixel selection signal PSS is (0, 0, 0), since the value of the row line selection signal LSS is “1”, the data which is the reverse type of the data corresponding to the previous gate line i.e., the first gate line GL11 is selected. Accordingly, the pixel selection signal PSS is the reverse type of the pixel selection signal PSS corresponding to the first gate line GL11. Accordingly, the refresh data R are selected for the R, G and B sub-pixels SP.

Dispersing flash with respect to row line is efficient to operate the OELD device with low power consumption. Accordingly, it is preferred that values of the pixel selection signals PSS on the same row line are the same, and values of the row line selection signals LSS alternate between “0” and “1”.

Figure 12:
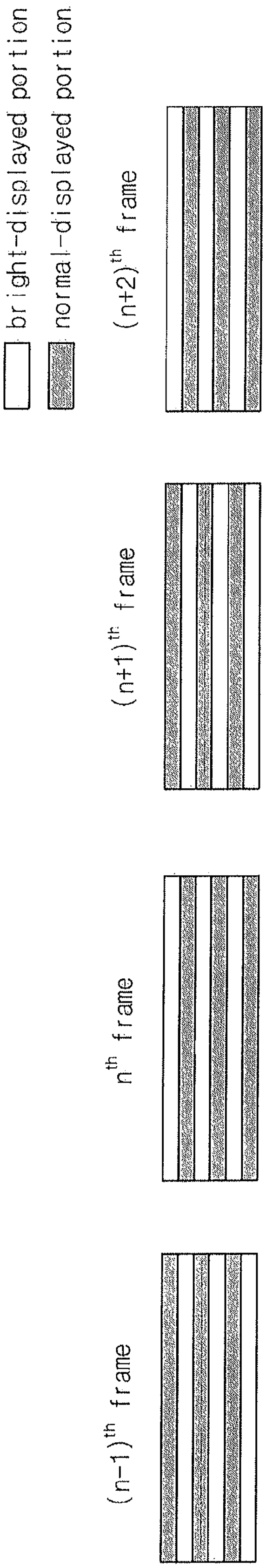
FIG. 12 is a view illustrating display patterns using a line mixing method according to the another embodiment of the present invention.

FIG. 12 is a view illustrating display patterns using the line mixing method according to the another embodiment of the present invention. Referring to FIG. 12, the flash can be improved, and power consumption can be reduced as well.

Referring back to FIG. 1, the power generating portion 320 supplies powers to operate the components of the driving portion. Further, the power generating portion 320 generates the first and second driving voltages VDD and VSS. The first driving voltage VDD is supplied to the sub-pixel SP through a first driving voltage line (not shown). The second driving voltage VSS is supplied to the sub-pixel SP through a second driving voltage line (not shown).

The gate driving portion 330 sequentially selects the gate lines GL11 to GLn2 in response to the gate control signal GCS from the timing control portion 310. Further, the gate driving portion 330 enables each gate line GL for a predetermined period, for example, a half of a horizontal period H. In other words, for the one horizontal period H, the gate driving portion 330 sequentially selects the first and second gate lines GLx1 and GLx2, and the selected gate line is enabled. For example, the first gate line GLx1 on a row line is enabled for a first half of a horizontal period H and then the second gate line GLx2 on the row line is enabled for a second half of the horizontal period H. A gate signal of a turn-on voltage is outputted to the selected gate lines. Accordingly, the switching transistors TS1 and TS2 connected to the selected gate lines are turned on. In synchronization with the selection of gate line, data voltages are outputted to the corresponding sub-pixels SP through the data lines DL. Accordingly, each sub-pixel SP is applied twice with the data voltage.

The data driving portion 350 generates and outputs data in analog format i.e., data voltages corresponding to data in digital format from the data selecting portion 340. The data voltages are generated using gamma reference voltages.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. An organic electroluminescent display device, comprising:

a plurality of sub-pixels in a matrix formed along a plurality of row and column lines and each including a light emitting diode;

first and second driving transistors in each of the respective sub-pixels, connected in parallel with each other, and connected to the organic light emitting diode;

first and second switching transistors in each of the respective sub-pixels, and connected to the first and second driving transistors, respectively;

first and second gate lines along the row line and connected to the first and second switching transistors, respectively; and a data selecting portion selecting a refresh data or an image data, wherein the data selecting portion selects one of the refresh data and the image data when the first switching transistor is turned on, and selects the other one of the refresh data and the image data when the second switching transistor is turned on, wherein the plurality of sub-pixels include sub-pixels an input sequence of the refresh data and the image data to which is reversed for a frame, wherein the plurality of sub-pixels include first and second sub-pixels, and wherein the refresh data and the image data are applied to the first and second driving transistors, respectively, of the first sub-pixel for the frame, and the image data and the refresh data area applied to the first and second driving transistors, respectively, of the second sub-pixel for the frame.

2. The device according to claim 1, wherein the input sequence to the sub-pixels along the row line is reversed per at least one column line.

3. The device according to claim 1, wherein the input sequence to the sub-pixels along the column line is reversed per at least one row line.

4. The device according to claim 1, wherein the input sequence to the sub-pixel is reversed for at least one frame.

5. The device according to claim 1, further comprising:

a data generating portion outputting the image data corresponding to the sub-pixels to the data selecting portion twice per horizontal period and supplying the refresh data to the data selecting portion; and a selection signal generating portion supplying a selection signal to the data selecting portion, wherein the data selecting portion selects the refresh data or the image data in response to the selection signal.

6. The device according to claim 1, further comprising a data line along the column line and connected to the first and second switching transistors.

7. The device according to claim 1, wherein the one of the refresh data and the image data is applied to the first driving transistor for a first period of the frame and the other one of the refresh data and the image data is applied to the second driving transistor for a second period of the frame.

8. A method of driving an organic electroluminescent display device, which includes a plurality of sub-pixels in a matrix form along a plurality of row and column lines and each including a light emitting diode, the method comprising:

sequentially scanning first and second gate lines corresponding to the row line and sequentially turning on first and second driving transistors of the sub-pixel;

inputting one of a refresh data and an image data to the sub-pixel when the first switching transistor is turned on; and inputting the other one of the refresh data and the image data to the sub-pixel when the second switching transistor is turned on, wherein the plurality of sub-pixels include sub-pixels an input sequence of the refresh data and the image data to which is reversed for a frame, wherein the plurality of sub-pixels include first and second sub-pixels, and wherein the refresh data and the image data are applied to the first and second driving transistors, respectively, of the first sub-pixel for the frame, and the image data and the refresh data area applied to the first and second driving transistors, respectively, of the second sub-pixel for the frame.

9. The method according to claim 8, wherein the input sequence to the sub-pixels along the row line is reversed per at least one column line.

10. The method according to claim 8, wherein the input sequence to the sub-pixels along the column line is reversed per at least one row line.

11. The method according to claim 8, wherein the input sequence to the sub-pixel is reversed per at least one frame.

12. The method according to claim 8, further comprising:

supplying the image data corresponding to the sub-pixels to a data selecting portion twice per horizontal period;

supplying the refresh data to the data selecting portion; and selecting the refresh data or the image data in the data selecting portion in response to a selection signal.

13. The method according to claim 8, wherein the one of the refresh data and the image data is applied to the first driving transistor for a first period of the frame and the other one of the refresh data and the image data is applied to the second driving transistor for a second period of the frame.

* * * * *